(12) United States Patent
Neff et al.

(10) Patent No.: US 9,780,634 B2
(45) Date of Patent: Oct. 3, 2017

(54) LOW COST MULTI-COIL LINEAR ACTUATOR CONFIGURED TO ACCOMMODATE A VARIABLE NUMBER OF COILS

(75) Inventors: Edward A. Neff, Cardiff By The Sea, CA (US); David Huang, Carlsbad, CA (US); Toan Vu, San Diego, CA (US)

(73) Assignee: Systems Machine Automation Components Corporation

(*) Notice: Subject to any disclaimer, the term of this patent is extended or adjusted under 35 U.S.C. 154(b) by 75 days.

(21) Appl. No.: 13/244,156

(22) Filed: Sep. 23, 2011

(65) Prior Publication Data

US 2012/0080960 A1   Apr. 5, 2012

Related U.S. Application Data

(60) Provisional application No. 61/385,898, filed on Sep. 23, 2010.

(51) Int. Cl.
| | | |
|---|---|---|
| *H02K 33/18* | (2006.01) | |
| *H02K 41/02* | (2006.01) | |
| *H02K 41/03* | (2006.01) | |
| *H01F 5/00* | (2006.01) | |
| *H01F 7/06* | (2006.01) | |
| *H02K 16/00* | (2006.01) | |

(52) U.S. Cl.
CPC ............ *H02K 41/031* (2013.01); *H01F 5/00* (2013.01); *H01F 7/066* (2013.01); *H02K 16/00* (2013.01); *H02K 2213/12* (2013.01); *Y10T 29/4902* (2015.01); *Y10T 29/49071* (2015.01)

(58) Field of Classification Search
CPC ........ H02K 41/00; H02K 35/04; H02K 33/18; H02K 41/02; H02K 41/025; H02K 41/03; H02K 41/031; H02K 41/035; H02K 41/0352
USPC ....... 310/27, 20, 15, 17, 12.15, 12.16, 12.21
See application file for complete search history.

(56) References Cited

U.S. PATENT DOCUMENTS

| | | |
|---|---|---|
| 3,602,749 A | 8/1971 | Esters |
| 4,488,242 A | 12/1984 | Tabata et al. |
| 4,576,421 A | 3/1986 | Teramachi |

(Continued)

FOREIGN PATENT DOCUMENTS

| | | |
|---|---|---|
| DE | 2217958 A1 | 10/1973 |
| EP | 0 556 469 A1 | 8/1993 |

(Continued)

OTHER PUBLICATIONS

International Search Report and Written Opinion for PCT/US11/53070, mailed Feb. 16, 2012, 6 pages.

(Continued)

*Primary Examiner* — Michael Andrews
(74) *Attorney, Agent, or Firm* — Cooley LLP

(57) ABSTRACT

Disclosed herein are methods and systems for low cost linear actuators that can deliver strokes and forces at different values. The embodiments presented herein have parts and components that may be usable for both multi-coil and single-coil actuator designs. According to one embodiment, a magnet housing may removably or permanently coupled to a coil assembly having any number of coils. According to a further embodiment, an actuator housing may be coupled to a magnet housing having any number of magnets or coils.

10 Claims, 5 Drawing Sheets

(56) References Cited

U.S. PATENT DOCUMENTS

| | | |
|---|---|---|
| 4,616,886 A | 10/1986 | Teramachi |
| 4,693,676 A | 9/1987 | Inaba |
| 4,745,589 A | 5/1988 | Nomura |
| 4,799,803 A | 1/1989 | Tanaka |
| 4,804,913 A | 2/1989 | Shimizu et al. |
| 4,808,955 A | 2/1989 | Godkin et al. |
| 4,857,786 A | 8/1989 | Nihei et al. |
| 4,858,452 A | 8/1989 | Ibrahim |
| 5,051,635 A | 9/1991 | Kasahara |
| 5,053,670 A | 10/1991 | Kosugi |
| 5,111,088 A | 5/1992 | Fujino |
| 5,160,865 A | 11/1992 | Gururangan |
| 5,175,456 A | 12/1992 | Neff et al. |
| 5,201,838 A | 4/1993 | Roudaut |
| 5,225,725 A | 7/1993 | Shiraki et al. |
| 5,270,625 A | 12/1993 | Neff |
| 5,317,222 A | 5/1994 | Neff et al. |
| 5,376,862 A | 12/1994 | Stevens |
| 5,446,323 A | 8/1995 | Neff et al. |
| 5,450,050 A | 9/1995 | Ban et al. |
| 5,476,324 A | 12/1995 | Takei |
| 5,501,498 A | 3/1996 | Ulrich |
| 5,594,309 A | 1/1997 | McConnell et al. |
| 5,685,214 A | 11/1997 | Neff et al. |
| 5,722,300 A | 3/1998 | Burkhard et al. |
| 5,751,075 A | 5/1998 | Kwon et al. |
| 5,834,872 A | 11/1998 | Lamb |
| 5,859,482 A | 1/1999 | Crowell et al. |
| 5,893,646 A | 4/1999 | Mizutani et al. |
| 5,952,589 A | 9/1999 | Leung et al. |
| 6,091,167 A * | 7/2000 | Vu .................. H01F 7/066 310/12.01 |
| 6,118,360 A | 9/2000 | Neff |
| 6,223,971 B1 | 5/2001 | Sato |
| 6,290,308 B1 * | 9/2001 | Zitzelsberger ............... 417/418 |
| 6,439,103 B1 | 8/2002 | Miller |
| 6,495,935 B1 | 12/2002 | Mishler |
| 6,741,151 B1 | 5/2004 | Livshitz et al. |
| 6,848,164 B2 | 2/2005 | Jung |
| 6,907,651 B1 | 6/2005 | Fisher et al. |
| 6,997,077 B2 | 2/2006 | Kollmann et al. |
| 7,053,583 B1 | 5/2006 | Hazelton |
| 7,168,748 B2 | 1/2007 | Townsend et al. |
| 7,323,798 B2 | 1/2008 | Hartramph et al. |
| 7,482,717 B2 | 1/2009 | Hochhalter et al. |
| 7,517,721 B2 | 4/2009 | Ito et al. |
| 8,083,278 B2 | 12/2011 | Yuan |
| 8,415,838 B1 | 4/2013 | Eghbal et al. |
| 8,498,741 B2 | 7/2013 | Ihrke et al. |
| 9,375,848 B2 | 6/2016 | Neff et al. |
| 9,381,649 B2 | 7/2016 | Neff et al. |
| 2003/0009241 A1 | 1/2003 | Kruger et al. |
| 2003/0218391 A1 | 11/2003 | Hirata |
| 2004/0076348 A1 | 4/2004 | Dalessandro et al. |
| 2005/0211512 A1 | 9/2005 | Fenwick |
| 2005/0234565 A1 | 10/2005 | Marks et al. |
| 2005/0253469 A1 | 11/2005 | Hochhalter et al. |
| 2006/0023980 A1 | 2/2006 | Kato et al. |
| 2006/0113847 A1 | 6/2006 | Randall et al. |
| 2008/0048505 A1 * | 2/2008 | Moriyama ............ H02K 41/03 310/12.22 |
| 2008/0157607 A1 | 7/2008 | Scheich et al. |
| 2008/0258654 A1 * | 10/2008 | Neff .................. 310/12 |
| 2009/0040247 A1 | 2/2009 | Cato et al. |
| 2009/0058198 A1 | 3/2009 | Finkbeiner et al. |
| 2009/0058201 A1 | 3/2009 | Brennvall |
| 2009/0058581 A1 * | 3/2009 | Neff et al. ............ 310/20 |
| 2009/0114052 A1 | 5/2009 | Haniya et al. |
| 2009/0152960 A1 | 6/2009 | Kimura et al. |
| 2009/0218894 A1 | 9/2009 | Aso et al. |
| 2009/0261663 A1 | 10/2009 | Aso et al. |
| 2009/0278412 A1 | 11/2009 | Kimura et al. |
| 2010/0005918 A1 | 1/2010 | Mizuno et al. |
| 2010/0133924 A1 | 6/2010 | Neff et al. |
| 2010/0203249 A1 | 8/2010 | Elgimiabi |
| 2010/0274365 A1 | 10/2010 | Evans et al. |
| 2011/0068595 A1 | 3/2011 | Ihrke et al. |
| 2012/0043832 A1 | 2/2012 | Neff et al. |
| 2013/0154397 A1 | 6/2013 | Sullivan |
| 2014/0159407 A1 | 6/2014 | Neff et al. |
| 2014/0159408 A1 | 6/2014 | Neff et al. |
| 2014/0159513 A1 | 6/2014 | Neff et al. |
| 2014/0159514 A1 | 6/2014 | Neff et al. |
| 2014/0210396 A1 | 7/2014 | Yamanaka et al. |
| 2015/0171723 A1 | 6/2015 | Neff et al. |
| 2015/0303785 A1 | 10/2015 | Neff et al. |
| 2016/0013712 A1 | 1/2016 | Neff et al. |
| 2016/0184989 A1 | 6/2016 | Neff et al. |
| 2016/0229064 A1 | 8/2016 | Neff et al. |

FOREIGN PATENT DOCUMENTS

| | | |
|---|---|---|
| EP | 1278109 | 1/2003 |
| EP | 1827073 | 8/2007 |
| GB | 645281 A | 10/1950 |
| JP | 61-116964 A2 | 6/1986 |
| JP | 04-181562 | 6/1992 |
| JP | 03285554 | 12/1992 |
| JP | A 06-260332 | 9/1994 |
| JP | 07-015942 | 1/1995 |
| JP | 07-131967 A | 5/1995 |
| JP | H09-214187 | 8/1997 |
| JP | 2000-152592 A | 5/2000 |
| JP | 2001-238427 A | 8/2001 |
| JP | 2001-286121 A2 | 10/2001 |
| JP | 2002-176292 | 6/2002 |
| JP | 2004-332935 | 11/2004 |
| JP | 2005-020901 A | 1/2005 |
| JP | A 2005-080415 | 3/2005 |
| JP | 2008-048556 A | 2/2008 |
| JP | 2008-155302 A2 | 7/2008 |
| JP | 2008-193845 A2 | 8/2008 |
| KI | 2010-178614 A | 8/2010 |
| KR | 10-2008-0090040 | 10/2008 |
| KR | 20-2011-0003488 | 4/2011 |
| KR | 10-2011-0139434 | 12/2011 |
| WO | WO 2007/026566 A1 | 3/2007 |
| WO | WO 2007/063729 A1 | 6/2007 |
| WO | WO 2009/116343 A1 | 9/2009 |
| WO | WO 2009/117827 | 10/2009 |
| WO | WO 2011/088964 A1 | 7/2011 |
| WO | WO 2014/076809 | 5/2014 |
| WO | WO 2015/117095 | 8/2015 |
| WO | WO 2015/154026 | 10/2015 |

OTHER PUBLICATIONS

"DC Motor Driver Fundamentals", TND6041/D, Semiconductor Components Industries, LLC, 2014, pp. 1-9.

EP Application No. 14191347.5, Extended European Search Report dated May 4, 2015, 7 pages.

"Moving coil motor technology", Maxon Precision Motors (http://machinedesign.com/motion-control/moving-coil-motor-technology), 1 page (PDF Copy Obtained On-Line Jul. 31, 2015).

http://news.thomasnet.com/fullstory/455177, "Actuator and Ball Spline come in mini and micro sizes", 5 pages, Downloaded Aug. 7, 2015.

http://www.lunabearings.com/won.htm, "Compact Ball Spline", 6 pages, Downloaded Aug. 7, 2015.

PCT/US2008/052121, International Search Report and Written Opinion mailed Aug. 6, 2008, 5 pages.

PCT/US2008/052121, International Preliminary Report on Patentability mailed Jul. 28, 2009, 5 pages.

PCT/US2008/071988, International Search Report and Written Opinion mailed Nov. 3, 2008, 5 pages.

PCT/US2008/071988, International Preliminary Report on Patentability mailed Feb. 2, 2010, 5 pages.

PCT/US2011/053070, International Preliminary Report on Patentability mailed Mar. 26, 2013, 5 pages.

PCT/US2011/053070, International Search Report and Written Opinion mailed Feb. 16, 2012, 3 pages.

(56) References Cited

OTHER PUBLICATIONS

PCT/US2013/047727, International Search Report mailed Oct. 16, 2013, 3 pages.
PCT/US2013/047727, Written Opinion mailed Oct. 16, 2013, 4 pages.
PCT/US2013/047727, International Preliminary Report on Patentability mailed Dec. 31, 2014, 5 pages.
PCT/US2013/047728, International Search Report mailed Oct. 16, 2013, 3 pages.
PCT/US2013/047728, Written Opinion mailed Oct. 16, 2013, 6 pages.
PCT/US2013/047728, International Preliminary Report on Patentability mailed Dec. 31, 2014, 7 pages.
International Search Report and Written Opinion for International Application No. PCT/US2015/014133, mailed Apr. 29, 2015, 8 pages.
International Search Report and Written Opinion for International Application No. PCT/US2015/024341, mailed Jul. 15, 2015, 10 pages.
International Preliminary Report on Patentability for International Application No. PCT/US2015/024341, issued Oct. 4, 2016, 8 pages.
International Search Report and Written Opinion for International Application No. PCT/US2015/054314, mailed Jan. 22, 2016, 10 pages.
International Search Report and Written Opinion for International Application No. PCT/US2016/014602, mailed May 12, 2016, 9 pages.
International Search Report and Written Opinion for International Application PCT/US2016/041793, mailed Oct. 3, 2016, 7 pages.

\* cited by examiner

LOW COST MULTI-COIL LINEAR ACTUATOR CONFIGURED TO ACCOMMODATE A VARIABLE NUMBER OF COILS

RELATED APPLICATIONS

This application claims priority to U.S. Provisional Patent Application Ser. No. 61/385,898, filed on Sep. 23, 2010, the contents of which are incorporated by reference herein.

FIELD OF THE INVENTION

The invention relates to moving coil actuators and, more particularly, to a low cost linear actuator that is configurable to include either a single or multiple coils wherein the single or multiple coil designs utilize the same base parts.

BACKGROUND OF THE INVENTION

Linear actuators are mechanical devices that transform electrical energy into mechanical energy to perform repetitive actions that require linear motion. For example, linear actuators can be used in an assembly plant to place caps on bottles, automatically stamp or label mail, cut glass, place chips on circuits, test various buttons or touch areas on electronic devices, and perform a wide variety of other tasks known in the art.

Some tasks may require one or more linear actuators as illustrated in patent application Ser. Nos. 12/622,372 and 12/860,809, the entireties of which are incorporated by reference herein. Typically, a low cost linear actuator has a single pole and a single 24 or 48 volt DC coil linear motor. Less movement occurs in typical low cost linear actuator designs because there is typically only one coil. Consequently, these designs typically provide a limited stroke distance or value (e.g., maximum stroke of 150 mm).

Some applications may require a higher stroke value (e.g., more than 150 mm). Actuators that provide a higher stroke value have longer magnetic circuits. Longer magnetic circuits generate less force than smaller magnetic circuits if a single coil is used. Accordingly, if the linear actuator has only one coil, the force that is generated for a given amperage drops as the stroke value is increased.

To generate more force for a longer stroke, more coils are typically added to actuators. More coils result in shorter magnetic circuits which consequently result in higher forces generated per a given generated current. However, actuators with multiple coils have a greater moving mass, a larger coil assembly, multiple expensive coils, and more expensive magnets as their polarities must be reversed periodically. Thus, traditional multiple coil designs are generally more expensive than their single coil counterparts.

Therefore, there is a need to reduce costs associated with linear coil actuators so that multiple coil linear coil actuators may be manufactured in a less expensive manner.

SUMMARY OF THE INVENTION

Presently disclosed embodiments are directed to solving issues relating to one or more of the problems presented in the prior art, as well as providing additional features that will become readily apparent by reference to the following detailed description when taken in conjunction with the accompanying drawings.

According to an embodiment, a magnet housing can be manufactured to have magnets and a coil assembly attachable to it. The coil assembly may have any number of coils and the magnet housing may have any number of magnets. The magnet housing is configured to be coupled to a wide variety of configurations of magnets and coil assemblies to deliver a pre-determined magnetic field. For example, a magnet housing manufactured for a 3 coil assembly and a magnet housing manufactured for a 6 coil assembly is identical. In a further embodiment, a center pole is positioned in the magnet housing between the coils.

In further embodiments, an actuator housing comprises a piston that is coupled to a linear guide assembly and the coil assembly. The linear guide assembly is configured to guide the piston in and out of the actuator housing according to a magnetic field whenever a current is driven through the coils of the coil assembly. In a further embodiment the actuator housing is configured to be coupled to the magnet housing. In a further embodiment, the actuator housing is configured to be coupled to the magnet housing irrespective of the number of coils or magnets contained within the magnet housing.

In a further embodiment, the coil assembly is configured as a uniform component that can be used in actuators having any number of coils. For example, according to an embodiment, the coil assembly for a 6 coil actuator is the same as a coil assembly for a 3 coil actuator. In a further embodiment, the coil assembly is configured to have 3, 6, or 9 coils coupled to it. In a further embodiment, all of the components of the invention may be removably coupled to each other. In an embodiment, all of the components may be manufactured to be usable and interchangeable in coil actuators having any number of magnets and coils.

Some embodiments may include a number of features executable through on-board circuitry (e.g., programmable positioning, speed, or force, and/or the ability to verify that one or more tasks have been successfully completed, or other tasks known in the art). In further embodiments, the linear coil actuator is configured to receive electrical communications to generate a magnetic field. In a further embodiment, the magnetic field generated by the coils is directly controlled by the amperage delivered to the electrical connection coupled to the linear coil actuator.

These and other embodiments will be more readily appreciated by persons of ordinary skill in the art with reference to the accompanying drawings and detailed description provided herein.

DETAILED DESCRIPTION OF EXEMPLARY EMBODIMENTS

In the following description of exemplary embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention.

In some embodiments, all or a portion of the manufactured parts can be machined on a CNC lathe such as the Hardinge model RS51MSY or other lathe that has the ability to machine both ends of a component (e.g., via sub-spindle transfer) as well as the ability to do mill work. In some embodiments, other manufacturing tools known in the mechanical arts may be used. According to some embodiments, each part can be made in a single operation on a lathe or other manufacturing tool, thereby reducing and/or eliminating the need for secondary operations. Some embodiments of the invention may be manufactured from aluminum, steel, or any material known in the art.

Figure 1C:
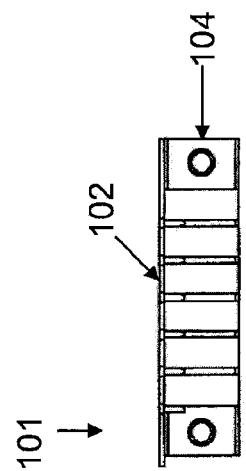
FIG. 1(c) illustrates an overhead view of an exemplary coil assembly having 6 coils according to an embodiment of the invention.
Figure 1B:
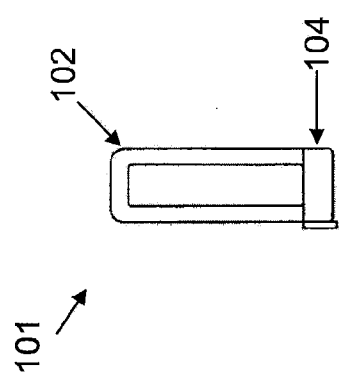
FIG. 1(b) illustrates a side view of an exemplary coil according to an embodiment of the invention.
Figure 1A:
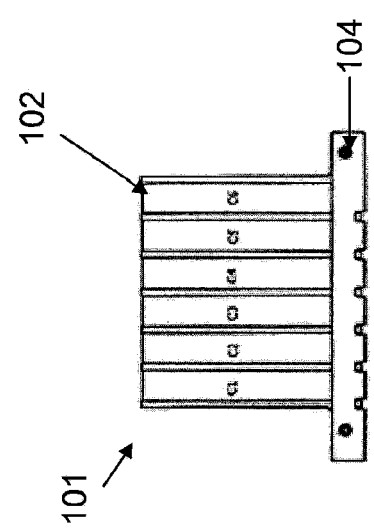
FIG. 1(a) illustrates a side view of an exemplary coil assembly having 6 coils according an embodiment of the invention.

An exemplary coil assembly 101 is illustrated in FIG. 1. Six coils 102 are mounted on a coil housing 104. Each coil 102 contains a conductive material wound in a series of loops wrapped around a bobbin. According to an embodiment of the invention, each coil 102 may be machined as a single unitary piece. According to a further embodiment, a set of a number of coils 102 may be machined as a single unitary piece. A magnetic field is generated when current is passed through the conductive material of each coil. The magnitude of the magnetic field corresponds to the number of turns associated with each coil 102 and the amperage conducted through the conductive material. The exemplary embodiment illustrated in FIGS. 1(a)-(c) utilizes 74 turns per coil but it is envisioned that any number of turns per coil may be used.

Additionally, the coil 102 illustrated in FIGS. 1(a)-(c) may have a resistance of approximately 1.7 ohms, 6.8 ohms per phase, with a 29 gauge copper wire. A person of ordinary skill in the art would recognize that these specifications are only exemplary. It is envisioned that any type of conductive material with varying specifications can be used. It is further envisioned that the coils may be electrically connected to a power source and/or connected together in any manner known in the electrical and mechanical arts.

In further embodiments, the coil housing 104 may comprise any number of coils 102. For example, when a smaller stroke for a linear actuator is required, it may be desirable to use only one coil 102. Since coils 102 are expensive, using only one will save costs. However, utilizing only one coil 102 will provide less force at a set stroke value. Thus, linear actuators having more than one coil 102 may be desired for tasks requiring higher stroke values.

In one embodiment, the coil housing 104 may be machined to be similar for any number of coils 102. That is, a coil housing 104 machined for one coil 102 is the same coil housing 104 machined for 6 coils 102. Hence, the only difference in the coil housings 104 would be the number of coils 102. This would allow a single manufacturing run to machine only one coil housing 104 design that can be used for linear coil actuators having any number of coils 102. This uniformity in machining saves overall manufacturing costs.

According to some embodiments, the number of coils 102 that can be housed on a coil housing 104 can be predetermined prior to manufacturing the coil housing 104. For example, a coil housing 104 may be manufactured having the capability of housing up to 6 coils.

In addition to saving manufacturing costs, maintenance costs would be saved. Due to the uniformity in product, parts would become easily replaceable. In addition, actuators that are simpler and are uniform require less training and documentation for maintenance workers to maintain and repair. Thus, additional costs associated with maintenance are also avoided.

It is envisioned that the one or more coils 102 may be machined directly on a coil housing 104 or may be machined separately so that they may be removably attached to the coil housing 104. This flexibility and uniformity further decreases costs associated with manufacture and maintenance.

A cross sectional view of the exemplary coil assembly 101 is illustrated in FIG. 1(b). The coil 102 is configured so that a magnetic field can be generated when current is conducted through the conductive material (e.g., copper, etc.) within the coil 102. The shape of the coil 102 is only exemplary, it is envisioned that the coil 102 may be any desired shape.

FIG. 1(c) illustrates a bottom view of the exemplary coil assembly 101. In this configuration, the coil assembly 101 may be removably placed, permanently movably coupled to, or movably coupled to an exemplary magnet housing 206 as illustrated in FIG. 2(a). As FIG. 2(a) illustrates, the bottom portion of the coil housing 104 of the coil assembly 101 may protrude from the magnet housing 206 so that it may be coupled to piston 414 (See FIG. 4). The magnet housing 206 may comprise one or more magnets 208 as illustrated in the cross sectional side view of the magnet housing 206 in FIG. 2(a). The magnets 208 are configured to magnetically interact with the one or more coils 102.

Figure 2B:
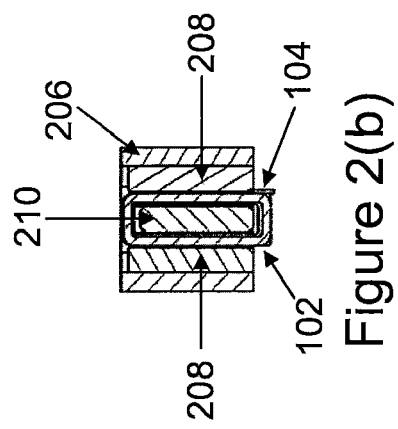
FIG. 2(b) illustrates a cross-sectional side view of exemplary magnet housing coupled to a coil assembly according to an embodiment of the invention.
Figure 2A:
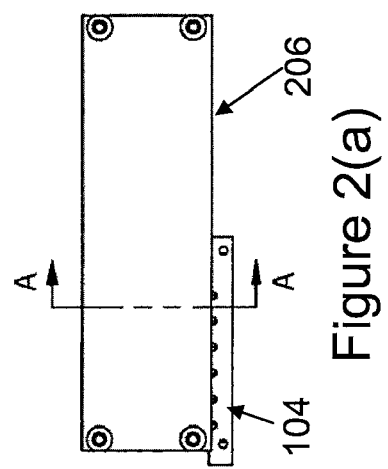
FIG. 2(a) illustrates a side view of exemplary magnet housing coupled to a coil assembly according to an embodiment of the invention.

As FIG. 2(b) illustrates, the coil 102 on the coil housing 104 of the coil assembly 101 can be positioned between two magnets 208 located on opposite portions of the magnet housing 206. A center pole 210 is positioned between the one or more coils 102 to allow linear reciprocal movement. There may be any number of magnets 208 located within the magnet housing 206. The magnets 208 may be any shape or size and may be removably attached, or permanently affixed to the magnet housing 206.

It is envisioned that the magnet housing 206 may be a similar base part for one or more designs. For example, the magnet housing 206 may be made to accommodate a coil housing 104 comprising one, three, six, or nine coils 102. It is envisioned that the magnet housing 206 may be made to be similar between any number and combination of coils 102. Accordingly, a magnet housing 206 may be the same base part usable for any number of actuators having any number of coils 102.

The flexibility of having a uniform magnet housing 206 allows parts to be manufactured for many different sets of actuators. Actuators may be constructed that use the magnet housing 206 to provide specific stroke values and forces according to the number of magnets 208 and coils 102 used. A single manufacturing run may be used to create a magnet housing 206 that is usable in many different actuators. Having the magnet housing 206 as a single base part saves costs because only a single magnet housing 206 needs to be created. When manufacturing multiple parts, machining tools need to be configured to machine multiple designs. This adds costs and possible complications. Thus, a uniform magnet housing 206 that is usable for many different actuator designs saves manufacturing costs.

Further, having a uniform design saves maintenance costs. A faulty magnet housing 206 can be easily replaced if it is standardized throughout a plant. In addition, costs associated with training maintenance workers and staff can be reduced as standardized components are easier to understand and work with. Due to the uniformity in design, workers are less prone to commit errors.

It is envisioned that the coil assembly 101 may be inserted into a magnet housing 206 in any manner known in the mechanical arts and that the magnet housing 206 may be of any shape. FIG. 2(a) illustrates the coil assembly 101 inserted through a top portion of the magnet housing 206. However, it is envisioned that the coil assembly 101 may be inserted from either side or from the bottom portion of a magnet housing 206.

Figure 3B:
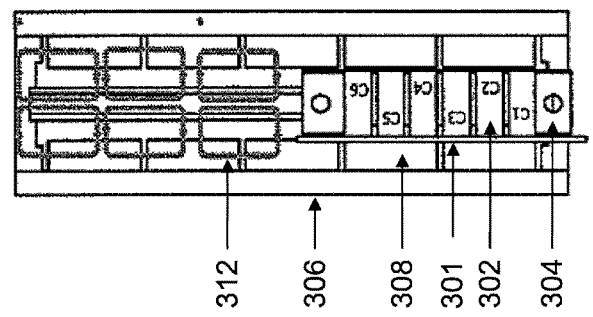
FIG. 3(b) illustrates an overhead view of exemplary magnet housing coupled to a coil assembly according to an embodiment of the invention.
Figure 3A:
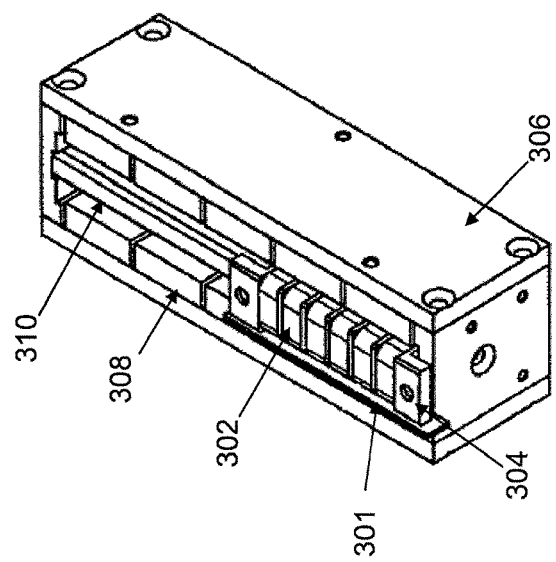
FIG. 3(a) illustrates a perspective side view of exemplary magnet housing couple to a coil assembly according to an embodiment of the invention.

FIG. 3(a) illustrates a perspective view of a magnet housing 306 that has 10 magnets 308. A center pole 310 is positioned between the one or more coils 302 to allow linear reciprocal movement. Magnetic circuits 312 generated by the permanent magnets 308 are illustrated in FIG. 3(b). The magnetic fields of the magnets 308 and the coils 302 interact to drive a piston 414 (See FIG. 4) when current is conducted through the conductive material in the coils 302.

In various embodiments, the magnet housing 306 may comprise any number of magnets 308 to generate any numbers of magnetic circuits 312. The magnets 308 of the magnet housing 306 may interact with any number of coils 302 that are inserted with a coil assembly 301 to generate a magnetic field to drive a piston 414 (FIG. 4) when current is conducted through the conductive material in the coils 302

In one embodiment, any part of the magnet housing 306 and/or the coil assembly 300 may be made of one or more similar base parts. Further, any part of the magnet housing 306 and/or the coil assembly 301 may be made of parts that are not uniform with one another. For example according to an embodiment, the coil assembly 301 may be made of parts that are specification specific (i.e., stroke value, force, etc.) but the magnet housing 306 may be made from parts that may be utilized for actuators having any specification (i.e., stroke value, force, etc.). Having one of one part that is not specification-specific to interact with a specification-specific part saves costs and allows parts to be manufactured to fit current systems. As previously explained, the uniformity in parts and components across a spectrum of actuators provides savings in both manufacturing and maintenance.

The coil assembly 301 may further be removably attached, or permanently coupled to, the magnet housing 306. With this flexibility, a single actuator comprising a single magnet housing 306 may be changed and configured to provide different forces at certain stroke values. Additionally, allowing the components to be removably attached can reduce maintenance costs as only one defective component would need to be replaced as opposed to an entire system.

Figure 4:
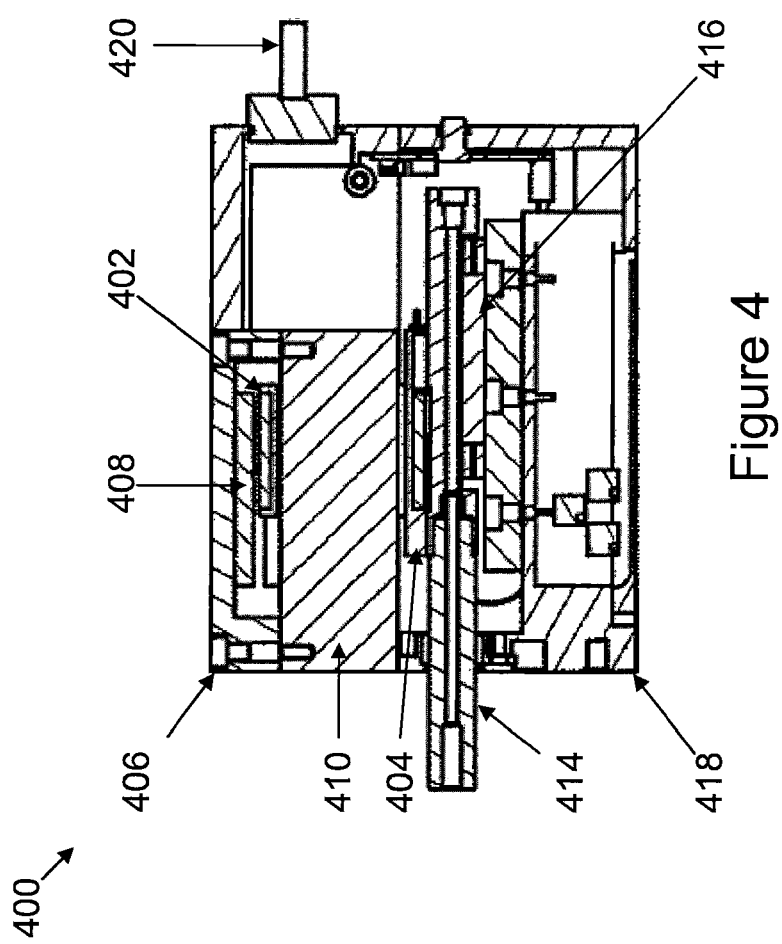
FIG. 4 illustrates a cross-sectional side view of an exemplary linear coil actuator having one coil according to an embodiment of the invention.

An exemplary low cost actuator 400 utilizing a coil housing 404 with one coil 402 is illustrated in a cross-section side view in FIG. 4. The coil housing 404 is coupled to a piston 414 so that the piston 414 moves when the coil housing 404 moves. The piston 414 is slidably attached to a linear guide assembly 416. The linear guide assembly 416 guides the piston's 414 movement and allows for linear reciprocal movement of the piston 414 in and out of the actuator housing 418.

An electrical current can pass through the coil 402 to generate a magnetic field that can interact with the magnet 408 to linearly move the piston 414 in or out of the housing 416. The direction of the piston's 414 movement depends on the polarity of the current that is conducted through the coil 402. The force of the movement depends on the amperage of the current, the size of the magnetic circuit, and the amount of turns of the conductor in the coil.

Any component in the embodiment of FIG. 4 may be made to be uniform between actuators having differing specifications. For example; FIG. 4 illustrates a magnet housing 406 having a coil assembly 400 having one coil 402. The same magnet housing 406 of FIG. 4 can house a coil assembly 400 having any number or types of coils 402.

Similarly, the center pole 410, the piston 414, the linear guide assembly 416, and the actuator housing 418 may be made from uniform parts. Thus, maintenance, repair, and manufacturing costs for each actuator may be lowered. It is envisioned that each component may be manufactured to be standardized and used for actuators of varying strokes, forces, and coils.

Electrical connections are provided by an electrical connector 420. It is envisioned that the actuator in FIG. 4 may comprise any number of electrical connections and may comprise any number of electronic control sequences. Further, exemplary embodiments may comprise any number of on-board digital control or analog circuitry known in the art. Further, it is envisioned that embodiments of the invention may be controlled remotely to lessen on-board circuitry and lessen overall actuator costs.

The exemplary embodiment of FIG. 4 may be useful when an application does not require a high stroke value. As illustrated in FIG. 4, the magnetic circuit and the stroke is smaller. A smaller magnetic circuit generates a greater force per a given current value. A smaller magnetic circuit requires fewer parts and requires fewer raw materials for manufacture. Requiring fewer parts and materials can provide manufacturing savings. Thus, the exemplary embodiment of FIG. 4 delivers a higher force and a smaller stroke at a lower cost.

However, a smaller magnetic circuit delivers a smaller force for a larger stroke value. For example, if the stroke distance of the piston 414 in FIG. 4 is increased, the force decreases as the size of the magnetic circuit increases. Increasing the stroke of the exemplary embodiment of FIG. 4 may lead to less force than an application requires.

Figure 5:
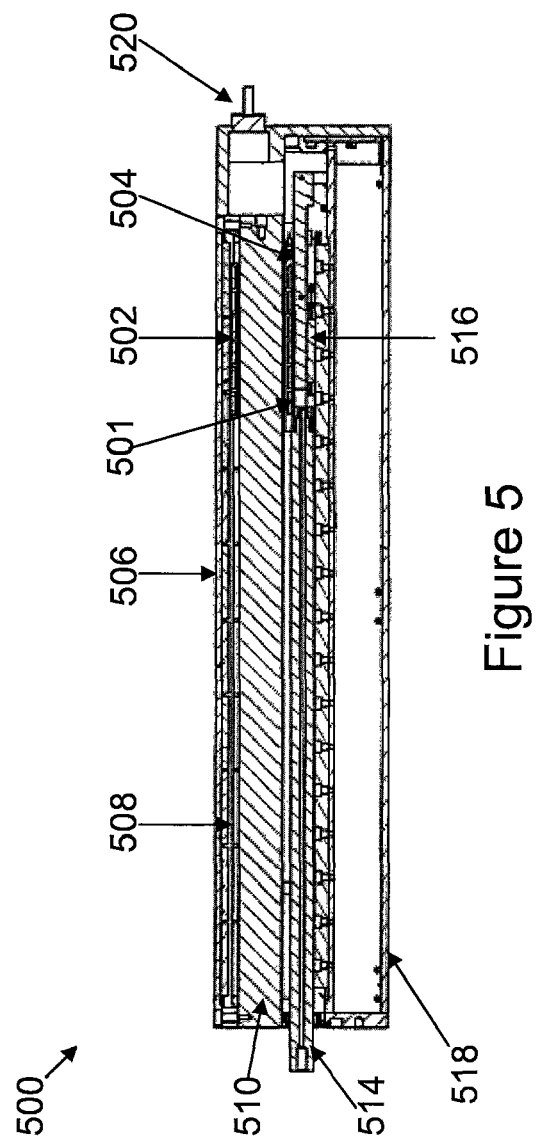
FIG. 5 illustrates a cross-sectional side view of an exemplary linear coil actuator having six coils according to an embodiment of the invention.

A cross-sectional view of an exemplary linear actuator 500 having a higher stroke value than the embodiment of FIG. 4 is illustrated in FIG. 5. In this exemplary embodiment, the magnet housing 506 comprises 10 magnets 508 and a coil assembly 501 having six coils 502 on a coil housing 504. A piston 514 is coupled to the coil housing 504. The piston 514 is coupled to the linear guide assembly 516. Attaching the piston 514 to the linear guide assembly 516 allows the piston 514 to slidably move in and out of the actuator housing 518. Passing current through the six coils 502 generates a magnetic field that interacts with the magnets 508 to slidably move the piston 514. The movement of the piston 514 depends on the amperage and polarity of the current. Power is provided to the linear actuator 500 from the electrical connection 520.

As illustrated in FIG. 5, stronger magnetic fields may be generated to generate a greater force in the linear movement of the piston 514. The greater force and the stronger magnetic fields allow the linear actuator 500 to have a greater stroke value without sacrificing force. Therefore, having more coils 502 may be preferable when a higher stroke is required.

Embodiments of FIG. 5 may have one or more components that can be manufactured to be uniform across linear actuators 500 having different coils 502. For example, any portion of the linear actuator 500 of FIG. 5 may be manufactured to be interchangeable with another. For example, the actuator housing 518 may be coupled to a magnet housing 506 having a coil assembly 501 that has any number of coils 502. Similarly, any number of coils 502 may be coupled to a coil housing 504 of a coil assembly 501 that can be coupled to the actuator housing 518.

Various embodiments of the invention may comprise one or more pieces of control circuitry. Further, embodiments of the invention may have one or more connections to accept communication signals from a remote location. Additionally, embodiments of the invention may comprise only an electrical connection wherein the amperage is controlled by a separate component.

It is further envisioned that coils comprising any number of turns may be utilized in embodiments of the invention. Coils having more turns generate larger forces but are more expensive. Coils having fewer turns generate smaller forces but are cheaper. It is further envisioned that coil assemblies may be uniform so as to house any number of coils having any number of turns.

It is further envisioned that the coils described herein may be machined as a single unitary piece. Further, it is envisioned that coils may utilize any conductive material having any impedance value.

It is further envisioned that any part described herein may be provided as an interchangeable component usable for linear actuators having different coils. For example, it is envisioned that the coil assembly may be combined with the magnet housing to provide a force of a certain value. The combination may then be attached to an actuator housing. A different combination of coil assembly and magnet housing may also be attached to the same actuator housing.

It is further envisioned that components of the invention may be removably or permanently attached to each-other. The removable or permanent attachment may be by any method known in the mechanical arts. Further, it is envisioned that one or more parts described herein may be machined as a single unitary piece.

It is further envisioned that any component may be manufactured for actuators having a certain predetermined amount of coils. For example, it may be predetermined that a manufacturing run will have magnet housings configurable to house 3, 6, or 9 coils. Similarly, each part may be manufactured to accept the predetermined coil parameters. It is envisioned that any predetermined coil parameter may be used.

While various embodiments of the present invention have been described above, it should be understood that they have been presented by way of example only, and not of limitation. Likewise, the various diagrams may depict an example configuration for the invention, which is done to aid in understanding the features and functionality that can be included in the invention. The invention is not restricted to the illustrated example configurations, but can be implemented using a variety of alternative configurations. Further, the drawings of components are exemplary and do not depict a scale or size of one component to another. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

What is claimed is:

1. A linear actuator comprising:
   a magnet housing having one or more magnets;
   a center pole;
   a coil assembly coupled to the magnet housing, wherein the coil assembly includes a coil housing configured to accommodate any one of 1 to N coils wherein the coil housing is configured the same whether accommodating any of 1 coil to N coils wherein the 1 coil and each of the N coils are made from the same base part and wherein each coil contains a conductive material wound around a bobbin and not around the coil housing and wherein one or more of the N coils are configured so that the center pole is positioned between the one or more of the N coils to allow linear reciprocal movement during operation of the linear actuator, wherein N is a predetermined integer greater than 1, wherein the magnet housing is configured the same irrespective of the number of coils coupled to the coil assembly, wherein the N coils are configured to generate a magnetic field when current is conducted through them;
   an electrical connector electrically coupled to the N coils, wherein the electrical connector is configured to receive one or more signals to control the current conducting through the N coils; and
   an actuator housing comprising:
   a piston configured to be coupled to the coil housing; and
   a linear guide assembly coupled to the piston, wherein the linear guide assembly is configured to slidably guide the piston so that a portion of the piston can move into and out of the actuator housing in a linear fashion.

2. The linear actuator of claim 1 wherein the coil housing is configured the same when accommodating any one of one, three, or six coils.

3. The linear actuator of claim 1 wherein the coil assembly is movably coupled to the magnet housing.

4. The linear actuator of claim 1 wherein the magnet housing is configured to be removably attached to the actuator housing.

5. The linear actuator of claim 1 wherein the N coils are configured to be removably attached to the coil assembly.

6. The linear actuator of claim 1 wherein the magnet housing is configured to contain any one of 1 to K magnets, where K is an integer greater than 1.

7. The linear actuator of claim 1 wherein the actuator housing is configured to accommodate the magnet housing irrespective of the number of coils and the number of magnets that are coupled to the coil assembly.

8. A linear actuator comprising:
   a magnet housing having one or more magnets;
   a center pole;
   a coil assembly coupled to the magnet housing, wherein the coil assembly includes a coil housing configured the same whether accommodating any of 1 coil to N coils wherein the 1 coil and each of the N coils are made from the same base part and wherein each coil contains a conductive material wound around a bobbin and not around the coil housing and wherein one or more of the N coils are configured so that the center pole is positioned between the one or more of the N coils to allow linear reciprocal movement during operation of the linear actuator, wherein N is a predetermined integer greater than 1, wherein the magnet housing is configured to be coupled to the coil assembly irrespective of the number of coils coupled to the coil assembly, wherein the N configured to generate a magnetic field when current is conducted through them;

an electrical connector electrically coupled to the N, wherein the electrical connector is configured to receive one or more signals to control the current conducting through the N coils; and an actuator housing comprising:
- a piston configured to be coupled to the coil housing; and
- a linear guide assembly coupled to the piston, wherein the linear guide assembly is configured to slidably guide the piston so that a portion of the piston can move into and out of the actuator housing in a linear fashion;

wherein the actuator housing is configured the same irrespective of the number of coils and the number of magnets that are coupled to the coil assembly that is coupled to the magnet housing.

9. The linear actuator of claim 8 wherein the coil assembly includes a coil housing configured to accommodate any one of 1 to N coils wherein the coil housing is configured the same irrespective of the number of coils coupled to the coil housing.

10. The linear actuator of claim 8 wherein the magnet housing is configured the same irrespective of the number of coils coupled to the coil assembly.

* * * * *